(12) United States Patent
Andrews et al.

(10) Patent No.: US 8,150,948 B2
(45) Date of Patent: Apr. 3, 2012

(54) COMPLEX SOFTWARE DEPLOYMENT

(75) Inventors: Dustin B Andrews, Carnation, WA (US); Sergei B Meleshchuk, Redmond, WA (US); John Shriver Blake, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 11/767,105

(22) Filed: Jun. 22, 2007

(65) Prior Publication Data
US 2008/0320109 A1   Dec. 25, 2008

(51) Int. Cl.
*G06F 15/177* (2006.01)

(52) U.S. Cl. .......... 709/220; 717/115; 717/168

(58) Field of Classification Search .......... 709/220; 717/115, 172, 177
See application file for complete search history.

(56) References Cited

U.S. PATENT DOCUMENTS

| | | | |
|---|---|---|---|
| 5,999,740 A * | 12/1999 | Rowley | 717/173 |
| 6,006,230 A * | 12/1999 | Ludwig et al. | 707/10 |
| 6,795,965 B1 * | 9/2004 | Yadav | 717/168 |
| 6,868,454 B1 * | 3/2005 | Kubota et al. | 709/237 |
| 6,892,382 B1 * | 5/2005 | Hapner et al. | 717/174 |
| 6,907,395 B1 * | 6/2005 | Hunt et al. | 703/21 |
| 7,210,143 B2 | 4/2007 | Or et al. | |
| 7,334,005 B2 * | 2/2008 | Sobel | 707/203 |
| 7,428,733 B2 * | 9/2008 | Woollen | 719/315 |
| 2002/0104071 A1 | 8/2002 | Charisius et al. | |
| 2002/0124245 A1 | 9/2002 | Maddux et al. | |
| 2003/0140107 A1 * | 7/2003 | Rezvani et al. | 709/208 |
| 2003/0221190 A1 * | 11/2003 | Deshpande et al. | 717/171 |
| 2005/0108702 A1 | 5/2005 | Baker et al. | |
| 2005/0210462 A1 | 9/2005 | Chupa et al. | |
| 2005/0289538 A1 | 12/2005 | Black-Ziegelbein et al. | |
| 2006/0037012 A1 * | 2/2006 | Zomaya et al. | 717/168 |
| 2006/0123414 A1 * | 6/2006 | Fors et al. | 717/177 |
| 2006/0168575 A1 * | 7/2006 | Bhatt et al. | 717/168 |
| 2006/0168581 A1 * | 7/2006 | Goger et al. | 717/174 |
| 2006/0272020 A1 * | 11/2006 | Gardner | 726/23 |
| 2007/0006122 A1 | 1/2007 | Bailey et al. | |
| 2007/0074182 A1 | 3/2007 | Hinchey et al. | |
| 2007/0074203 A1 | 3/2007 | Curtis et al. | |
| 2007/0234427 A1 * | 10/2007 | Gardner et al. | 726/23 |
| 2008/0098386 A1 * | 4/2008 | Leung et al. | 717/174 |
| 2008/0201454 A1 * | 8/2008 | Soffer | 709/220 |

OTHER PUBLICATIONS

Birngruber, "A Software Composition Language and Its Implementation", retrieved at <<http://www.ssw.uni-linz.ac.at/General/Staff/DB/Research/Projects/CoPL__CoML/birngr__66__abstract.html>>, vol. 2244, Springer-Verlag, 2001, pp. 1-5.

Balasubramanian, et . al., "Developing Applications Using Model-driven Design Environments", vol. 39, No. 2, IEEE Press, Feb. 2006, pp. 1-8.

Deng, et. al., "DAnCE: A QoS-enabled Component Deployment and Configuration Engine", Nov. 2005, pp. 15.

* cited by examiner

*Primary Examiner* — Patrice Winder
*Assistant Examiner* — Tauqir Hussain (57) ABSTRACT

Systems and methods of deploying one or more software components to a target computer infrastructure are disclosed. A descriptor file that declares a desired state of one or more target computing devices of a target computer infrastructure is parsed. A live state of the one or more target computing devices is obtained. A set of target computing devices having the live state different from the desired state is identified. A plan script that includes deployment commands configured to deploy one or more software components to each computing device is generated. The plan script can be optimized such that when executed the software components are deployed with higher efficiency, system stability, minimum downtime, etc.

20 Claims, 7 Drawing Sheets

COMPLEX SOFTWARE DEPLOYMENT

BACKGROUND

The increasing complexity of computer software and distributed networks has made the deployment software components more intricate and difficult. In addition, the installation of a complex software package having multiple software components requires cohesiveness and efficiency. Conventional solutions include the manual installation of software components by a system administrator. Of course, this approach can prove to be tedious and susceptible to human error. Other approaches use an ad hoc series of scripts that are coded by an administrator and that deploy software components in some order. In order for an administrator to change the installation scripts of a deployment, administrators generally have to manually edit deployment scripts. These solutions scale poorly and are hard to maintain.

Furthermore, conventional systems generally require all software components to be deployed at once. This limits the capability to test the correct deployment of a particular software component without having to deploy the entire system. Some conventional deployment systems require that the infrastructure be unavailable while new software components are being deployed.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one aspect, a method to deploy complex software to a target computer infrastructure is disclosed. The deployment of complex software includes permitting an administrator to provide a description file that describes the desired state of the target computer infrastructure. The description file can be parsed at a deployment control center. In addition, the live state of the target computer infrastructure can also be determined at the deployment control center. A comparison of the live state and the desired state of each infrastructure resource can be performed to determine state deltas. Based on such comparison, it is determined whether the infrastructure resource requires the deployment of a new software component. A plan script can be generated in order to deploy software components to the infrastructure resources requiring deployment of the new software components. In a further aspect, the plan script can be optimized for fast deployment of component modules, efficiency, testability, and the like.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Methods and systems for deploying complex software are disclosed herein. A system administrator can be provided with the ability to configure a descriptor file that describes the desired state of a target computer infrastructure. A plan script can be generated based on the configuration of the target computer infrastructure as indicated in the descriptor file. The plan script can include deployment commands that are executed as specified by the administrator.

In one embodiment, an administrator can select partial execution of the plan script. Partial execution of the plan script can allow for testing of each infrastructure resource in isolation. Therefore, portions of a computer infrastructure can be tested without the need to test the entire infrastructure. This, in turn, permits better encapsulation, scalability, and loose coupling of software components being deployed to a target computer infrastructure.

A plan script can be generated to include deployment commands for the deployment of one or more software components. As disclosed herein, a software component can be any type of digital data installed on a target computing device or other infrastructure resource. Examples of software components to be deployed can include application software, configuration parameters, application program interfaces, device drivers, protocol definitions, registry keys, performance counters, databases, configuration files, security certificates, web sites, compression keys, decryption keys, passwords, compression tables, lookup tables, and the like. Furthermore, the deployment of software components can refer to updating, installing, configuring, uninstalling, or maintaining a particular software component in a target computer device or any other infrastructure resource.

Finally, while various examples disclosed herein utilize a target computer device as the infrastructure resource that receives the deployment of a software component, software components can be deployed to any infrastructure resource. As used herein, an infrastructure resource can be any physical or logical software or hardware device that is part of the target computer infrastructure and that can be configured and/or updated with software components. In one example, infrastructure resources can include computer parts of the target computing devices such as network cards, disk drives, modems, and the like. In another example, infrastructure resources can include computing devices such as servers, host computers, client computers, and the like. In another example, infrastructure resources can include logical devices.

Of course, the type of infrastructure resource can vary according to the type of target computer infrastructure and/or topology of the computer infrastructure. For example, if the computer infrastructure is a cellular network, the infrastructure resources can include base transceiver antennas, base transceiver controllers, modems, channels, mobile devices registered with the network, among others. In another example, if the infrastructure is an enterprise computer network, the infrastructure resources can be for example computer servers, database engines, routers, client machines, and/or subcomponents thereof. Accordingly, although the present examples are described and illustrated herein as being implemented in an particular computer infrastructure, the system described is provided as an example and not a limitation. As those skilled in the art will appreciate, the present examples are suitable for application in a variety of different types of computer infrastructures.

Figure 1:
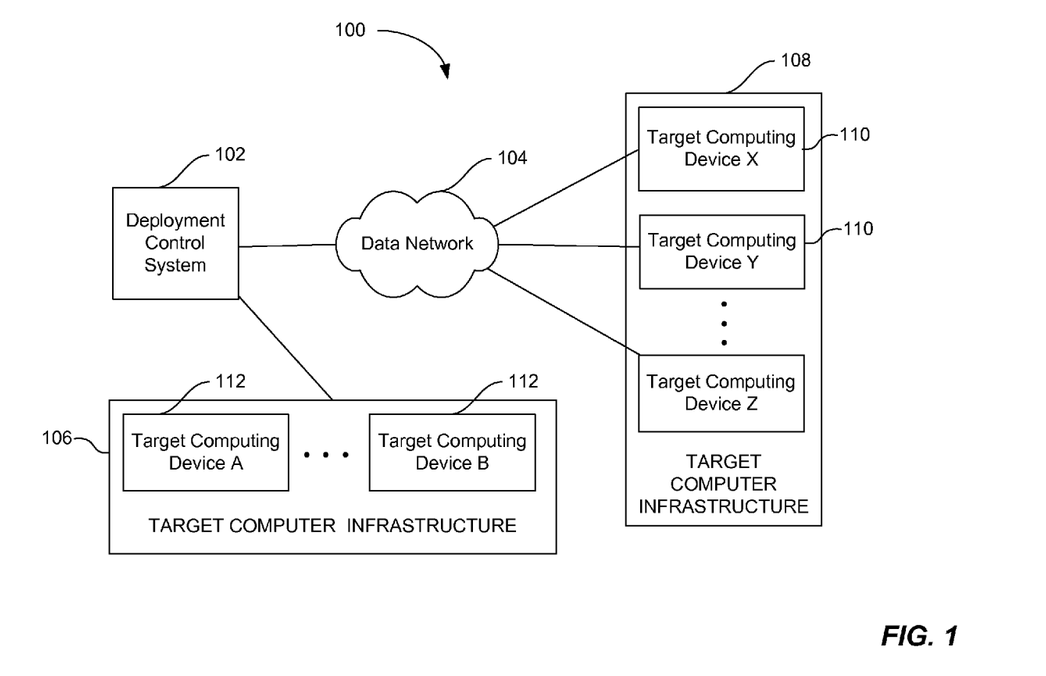
FIG. 1 illustrates a component diagram of a system for deploying complex software according to one embodiment.

FIG. 1 illustrates an exemplary component diagram of a system for deploying complex software according to one embodiment. System 100 can include a deployment control system 102 that can be utilized by an administrator to deploy software components to one or more target computing devices 110, 112 and infrastructure resources. The administrator can utilize the deployment control system 102 to install, update, and maintain software components in the target computing devices 110, 112 of the target computer infrastructure 106, 108.

In one embodiment, the deployment control system 102 can be configured to communicate directly with a target computer infrastructure 106 to deploy software components to target computing devices 112. The target computer infrastructure 106 can include one or more computing devices, such as servers, hosts, clients, database engines, handheld devices, wireless devices and the like. In addition, the target computer infrastructure 106 can include other infrastructure resources. Furthermore, the deployment control system 102, as it will be discussed below, can be configured with logic to deploy software components according to the desired state in which the administrator wants the target computing device 112 to be.

In another embodiment, the deployment control system 102 can deploy software components via a data network 104 to a target computer infrastructure 108. The target computer infrastructure 108 can include target computing devices 110 that can also communicate via the data network 104 with the deployment control system 102. In one embodiment, the data network 104 is the Internet. In another embodiment, the data network 104 is an intranet. In another embodiment, the data network 104 is a telecommunications network. For example that target computing devices 110 can be telecommunication devices such as cell phones, Smart phones, and the like.

Figure 2A:
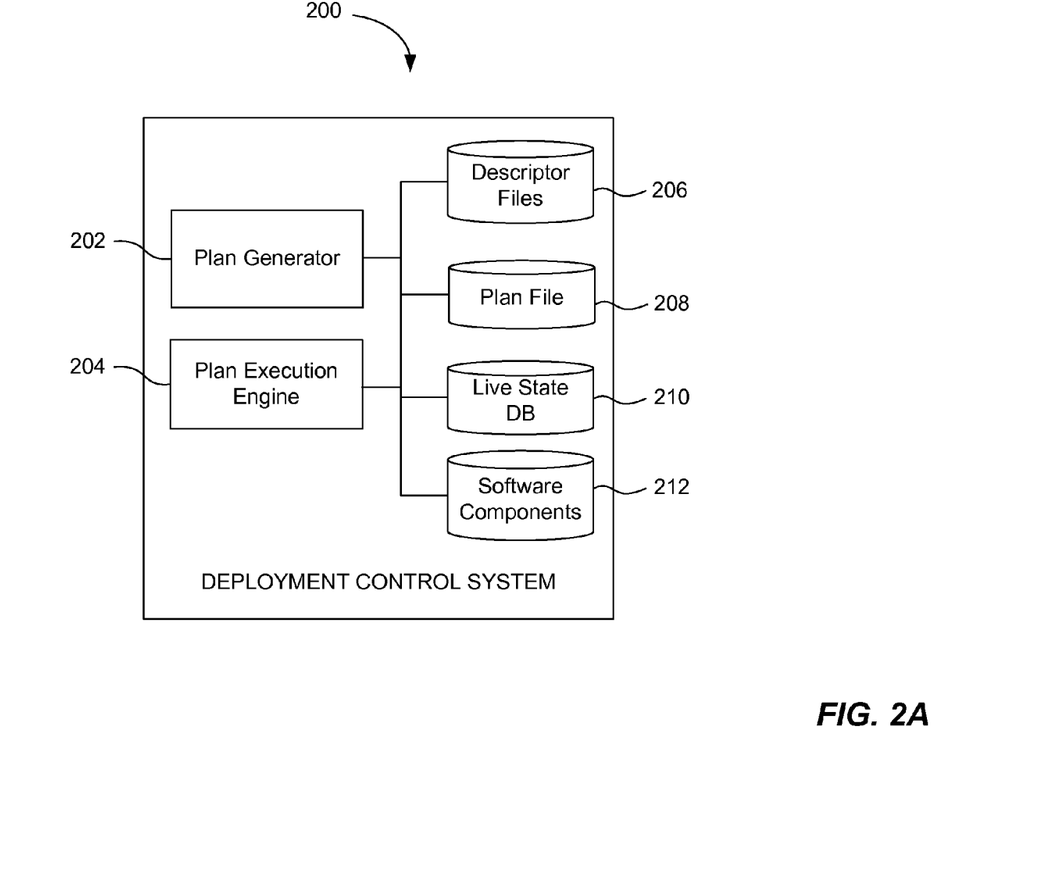
FIG. 2A illustrates a component diagram of a deployment control system according to one embodiment.

FIG. 2A illustrates a component diagram of a deployment control system according to one embodiment. In one embodiment, the deployment control system 200 can include a plan generator 202 and a plan execution engine 204. The plan generator 202 can be configured to parse a descriptor file 206 in order to generate a plan script. The plan script can be stored in a plan file 208.

In order to generate the plan script, the plan generator 202 can be configured to retrieve configuration data contained in the descriptor file 206. In one embodiment, the configuration data stored in the descriptor file 206 can be expressed in a declarative language. Such configuration data can be indicative of the desired state of various target computing devices 110, 112 or other infrastructure resources. The states indicated by the data in the descriptor file 206 reflect the desired states of the target computing devices 110, 112 as configured by the administrator. As such the descriptor file 206 can be a text file scripted in a computer language (e.g., CSV, Key-Value, XML) that can be interpreted and parsed by the plan generator 202.

As such, a system administrator can be permitted to edit and script the descriptor file 206 according to the desired configuration of the system. In one example, the descriptor file 206 can describe the hosts of the target computer infrastructure and the software stored in each host computer. In another example, the descriptor file 206 can describe the communication ports that are active for a given target computing device. In another example, the descriptor file 206 can describe the maximum number of licensed users that can access a particular database engine residing in a target computing device 110, 112. In yet another example, the descriptor file 206 can describe the application software to be installed in each target computing device, drivers to be installed in various computer parts, and security certificates to be placed in each target computing device. Of course, various other examples exist of configurations that can be described in a computing device.

When deploying one or more software components, an administrator can update and/or edit a descriptor file 206 to reflect the state of target computing devices and/or any target infrastructure resources. As mentioned above, the administrator can edit the descriptor file 206 to ensure that software components are deployed to take the target computing devices and/or infrastructure resources to the desired state.

In one embodiment, the plan generator 202 can be configured to compare the desired state in the descriptor file 206 with the live state of target computing devices or infrastructure resources. As used herein the live state of a target computing device is the version of the software running on the target computing device, or the software component currently being associated with an infrastructure resource. In one example, the live state of a media player can be the decryption key associated with the media player. In another example, the live state of a network adapter can be the driver installed therein. In another example, the live state of a web server can be the web server application version stored therein.

The live state of a target computing device 110, 112 can be obtained in various manners. In one embodiment, the live state can be obtained by querying the target computing device directly. In another embodiment, the live state can be obtained by querying a registry of the deployment control system 200. In another embodiment, the live state can be retrieved from a live state database 210.

Upon comparing the desired state and the live state of one or more target computing devices and/or infrastructure resources, the plan generator 202 can be configured to generate a plan script and store the plan script in a plan file 208. The plan script can be generated to include the deployment commands needed to place the target computing devices and/or infrastructure resources into the desired states.

In one embodiment, the plan generator 202 creates the plan based on the deltas of the live states of the target infrastructure and the desired states of the target infrastructure. For example, the plan generator 202 can generate a plan script that only includes the updated installation and/or deployment of software components to target computing devices that have different software components than what is required or needed according to the descriptor file 206. Thus, having a plan script that only addresses those target computing devices and/or infrastructure resources required to be updated avoids the unnecessary installation or deployment of software already installed on the target computing devices and/or infrastructure resources. In another embodiment, the plan generator creates the plan without regard to delta of the target computer infrastructure but instead acts as if the target computer infrastructure was completely un-configured regardless if this is the actual case. Thus, a plan script could contain all the possible configuration actions that would be performed on an un-configured target computer infrastructure. Such a plan script could be used as a template for un-configured systems, saving the planning stage. In addition, this plan could also be used as a post-install checklist to determine that a target computer infrastructure that was installed by any means, including manually, by a delta plan or from a full install plan, is correct.

The plan generator 206 can be configured to identify a set of target computing devices having the live state different from the desired state. In addition, the plan generator 206 can be configured with logic to generate a plan script that includes computer commands that deploy one or more software components of a complex software package to each computing device in the set of target computing devices. As a result, the live state of each computing device in the set of target computing devices can be changed to the desired state. As such, the plan script can include deployment commands to call one or more functions that when executed, deploy software components to target computing devices and/or infrastructure resources.

The plan script can include calls to one or more deployment commands configured to deploy software components to target computing devices and/or infrastructure resources. As such, the plan script can be generated in a procedural language. In other words, the plan script can be generated to include function calls that perform actions such as installing, uninstalling, updating, etc. In one embodiment, the computer language utilized as the plan script language can be any known, or to be known, scripting language. In another embodiment, the computer language utilized as the plan script language can be any known, or to be known, programming language. In another embodiment, the computer language utilized can be a scripting language exclusively known to the plan generator 202 and a plan execution engine 204.

In one embodiment, the plan execution engine 204 can be configured with logic to read a plan script and interpret the plan script to execute deployment commands stored therein. Upon reading the plan script, the plan execution engine 204 can communicate with one or more target computing devices to deploy one or more software components. The plan execution engine 204 can deploy software components to target computing devices and/or infrastructure resources using various methods. In one example, the plan execution engine 204 can invoke a function to be executed at the target computing device. In another example, the plan execution engine 204 can execute an installation function, such as an applier, to deploy software components. In yet another example, the plan execution engine 204 can send a message with the necessary data to be deployed to the target computing device. For instance, if the target computer device is to be activated, the target computing device can receive an activation message from the plan execution engine 204.

Furthermore, the plan execution engine 204 can be configured to retrieve one or more software components from a software component repository 212. Upon retrieving a software component from the software component repository 212, the plan execution engine 204 can utilize appliers to deploy the software components. In another example, the plan execution engine 204 can transmit the software component to the target computing device as a message.

In addition, the plan execution engine 204 can also be configured with logic to update the live state database 210 with the new live state of the target computing devices and/or infrastructure resources to which new software components were deployed.

One skilled in the art will recognize that the various databases discussed herein can be combined into one or more data repositories, and be located either locally or remotely. In addition, each of the aforementioned databases can be any type of data repository configured to store data and can be implemented using any methods of storage now known or to become known. Likewise, while various modules have described herein, one skilled in the art will recognize that each of the aforementioned modules can be combined into one or more modules, and be located either locally or remotely. Each of these modules can exist as a component of a computer program or process, or be standalone computer programs or processes recorded in a data repository.

Figure 2B:
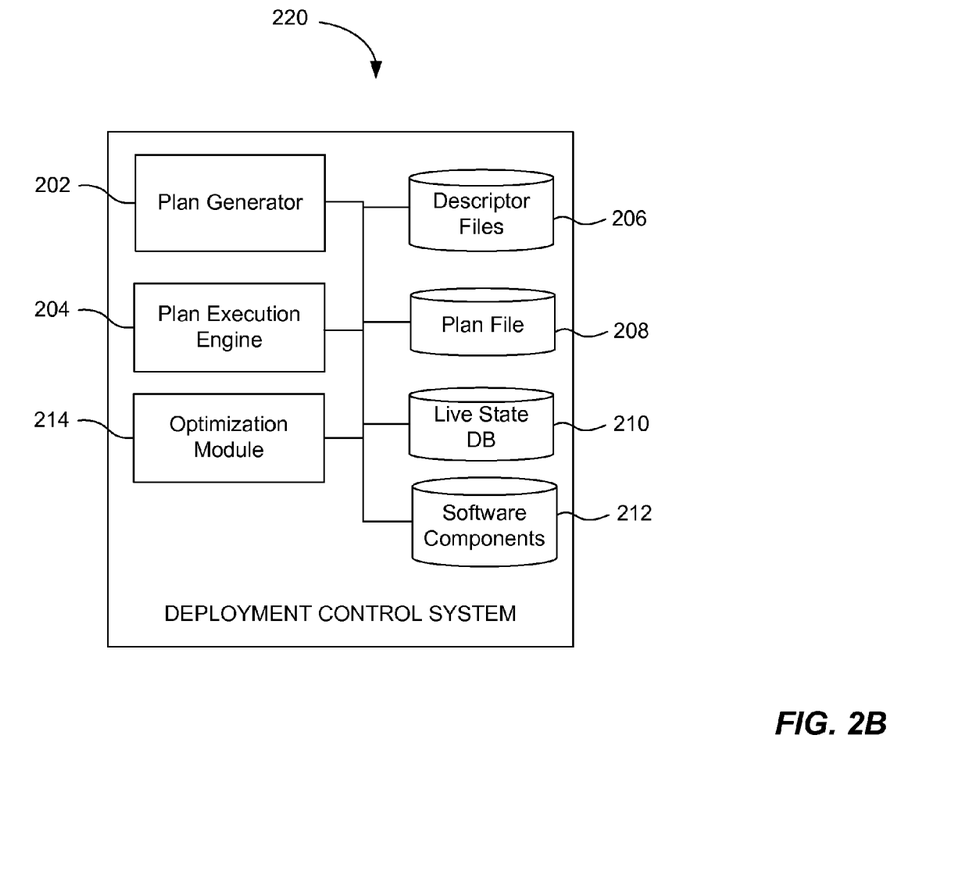
FIG. 2B illustrates a component diagram of a deployment control system according to another embodiment.

FIG. 2B illustrates a component diagram of a deployment control system according to another embodiment. The deployment control system 220 can include similar components as the deployment control system 200. In addition, the deployment control system 220 can further include an optimization module 214.

In one embodiment, the optimization module 214 can be configured to remove redundant deployment commands from the plan script. During the course of generating a plan script, deployment commands may be repeated. The plan generator 202 can generate two exact deployment commands based on the contents of a descriptor file 206. For example, if a descriptor file 206 includes a parent device to have a software update 1.1, and a child device to have a software update 1.1, the plan generator 202 may generate two deployment commands for the child device to have the software update 1.1. One deployment command to the child device can be generated from updating the parent device, and the second deployment command can be generated from updating the child device. In this example, the optimization module 214 can work to remove one of the redundant deployment commands. As such, the optimization module 214 can be configured to remove unnecessary deployment component calls and therefore increase the efficiency of the deployment of software.

In another embodiment, the optimization module 214 can be configured with logic to reorder the deployment commands such that the deployment is more convenient to transmit to the target computer infrastructure as a whole. In addition the optimization module 214 can also error check the plan script and optimize the plan script by ordering the deployment software to be in a pre-specified order, or as required by the administrator.

Figure 3:
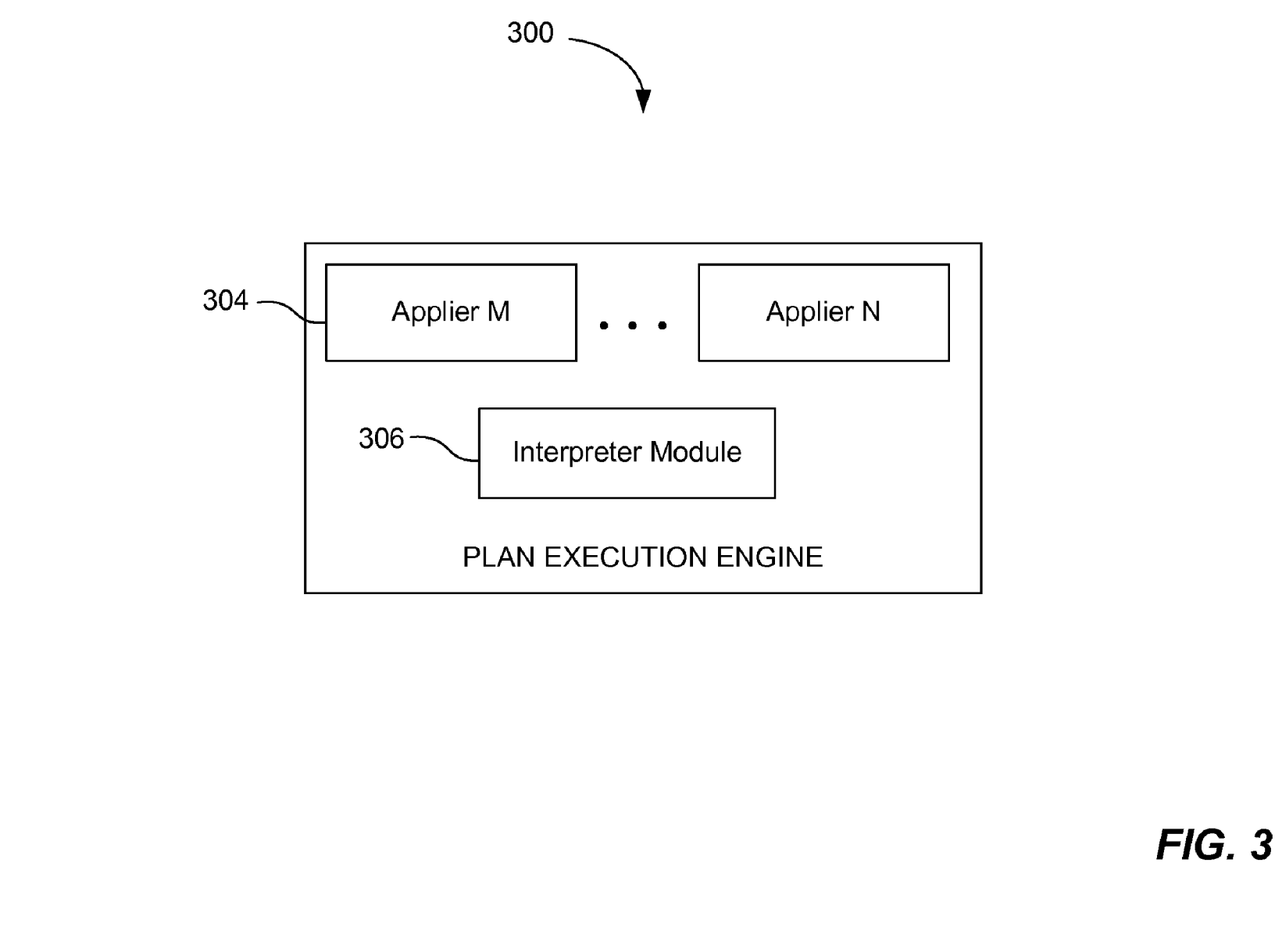
FIG. 3 illustrates a component diagram of a plan execution engine according to one embodiment.

FIG. 3 illustrates a component diagram of a plan execution engine according to one embodiment. The plan execution engine 300 can include an interpreter module 306 configured with logic to interpret the deployment commands of the plan script according to plan language rules. For example, the interpreter module 306 can be configured to invoke appliers, such as appliers 302 and 304 in order to install and deploy software components to computing devices and/or infrastructure resources.

In one embodiment, the plan language is a procedural language. Thus, the interpreter 306 can be configured to interpret the deployment commands and perform the actions associated with installing software components in the target infrastructure. Furthermore, the plan language can include commands that permit passing variables and parameters to the appliers, such that the appliers can execute one or more functions and methods to deploy the software components.

Figure 4:
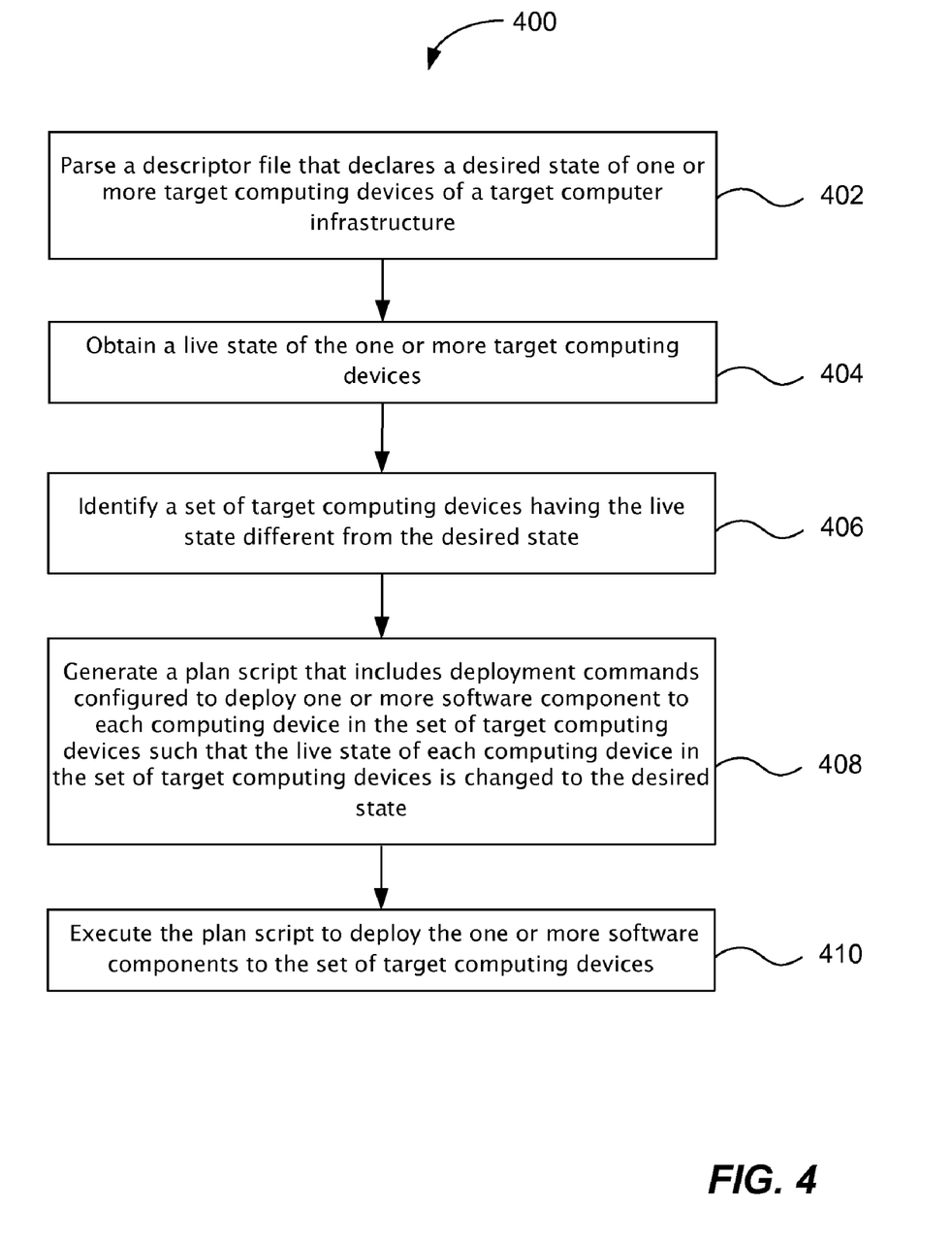
FIG. 4 illustrates a flow diagram of a process for deploying complex software to a computer infrastructure according to one embodiment.

FIG. 4 illustrates a flow diagram of a process for deploying complex software to a computer infrastructure. At process block 402, a descriptor file that declares a desired state of one or more target computing devices of a target computer infrastructure is parsed. As previously mentioned, the descriptor file can be parsed by the plan generator 202. Process 400 continues at process block 404.

At process block 404, the live state of the one or more target computing devices is obtained by the plan generator 202. The live state can be obtained in various manners. For example, the plan generator 202 can query from one or more computing target devices the live state of each target device. In another example, the plan generator 202 can query the live state of each target computing device from the live state database 210. Process 400 continues at process block 406.

At process block 406, a set of target computing devices having the live state different from the desired state is identified. The set of target computing devices can be a subset of the target devices of the target computing infrastructure. Process 400 continues at process block 408.

At process block 408, a plan script is generated. The plan script can include deployment commands that when executed deploy one or more software components to each computing device in the set of target computing devices such that the live state of each computing device in the set of target computing devices is changed to the desired state. As such a deployment command can be commands that call functions such as appliers and any other commands that set configuration data in the one or more target computing devices such that the target computing devices are changed to the desired state. Process 400 continues at process block 410.

At process block 410, the plan script to deploy the software components to the set of target computing devices is executed. The plan script can be executed by the interpretive module 306, which can in turn invoke one or more appliers that perform the installation and deployment of software components and data.

In some embodiments, once the plan script is generated, and before the plan script is executed, the plan script can be optimized according to one or more rules. An administrator can set up such rules, or configure the optimization module 214 to optimize the plan script according to specific needs of the administrator. For instance, the administrator can choose to execute the plan script in order to deploy software components with minimum target computer infrastructure downtime. In order to achieve this, the execution of the plan script commands can be performed as unobtrusively as possible such that deployment commands are executed with a period of time in between so as to minimize the impact on the target computer infrastructure. In another example, the administrator can choose to execute the plan script with maximum speed.

Figure 5A:
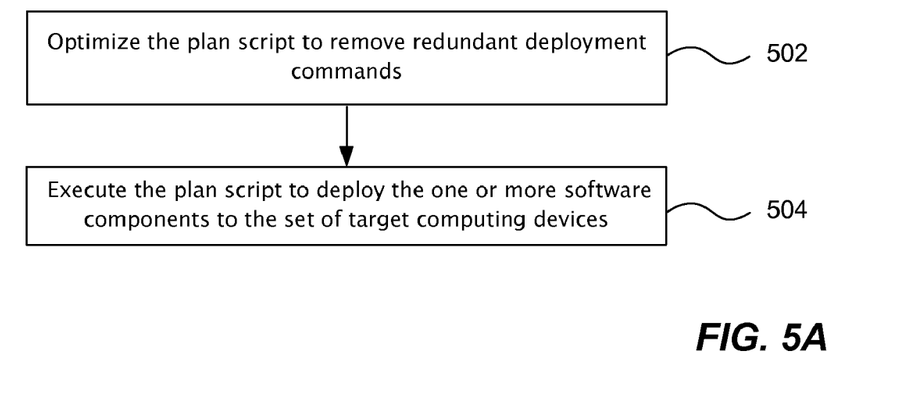
FIGS. 5A-5C illustrate flow diagrams of optimization processes that can be performed in some embodiments.

FIG. 5A illustrates a flow diagram of an optimization process that can be performed according to one embodiment. At process block 502, redundant deployment commands are removed from a plan script. Thus, a plan script including two deployment commands to install a particular version of software on a target computing device can be optimized to invoke the deployment command only once. The optimization module 214 can be configured to recognize the redundant deployment commands and remove one of them. At process block 504 the plan script is executed to install the software components.

Figure 5B:
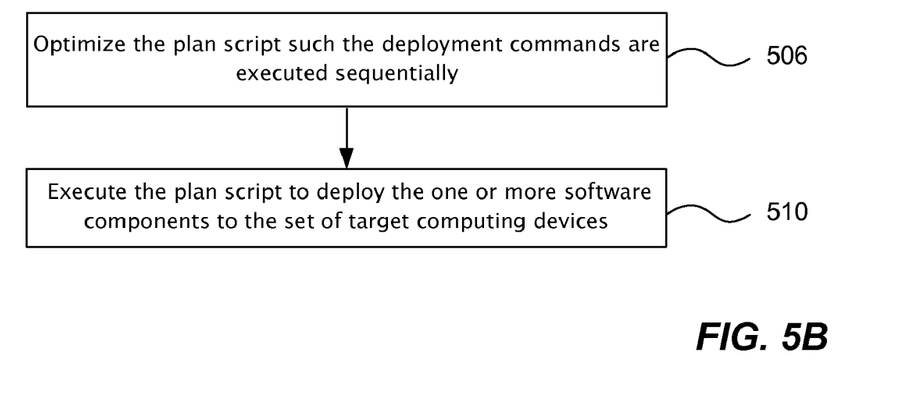

FIG. 5B illustrates a flow diagram of an optimization process that can be performed according to another embodiment. At process block 506, the plan script can be optimized such that the deployment commands can be executed sequentially. In one example, an administrator can choose when to execute the next deployment command. Thus, an administrator can test the correct execution of a deployment command without having to execute the plan script in its entirety. In addition, an administrator can choose to execute each deployment command, and wait a predetermined period to allow the target computer infrastructure to stabilize before the next deployment command is executed. In addition, the administrator can vary the waiting time before executing the next command. As mentioned above, an administrator can be provided with the option of optimizing the plan script to have minimum impact on the target computer infrastructure. At process block 508, a plan script is executed to install the software components.

Figure 5C:
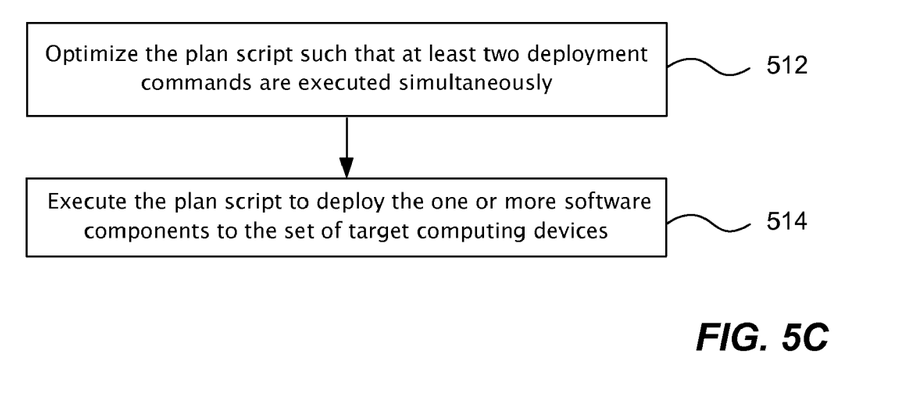

FIG. 5C illustrates a flow diagram of an optimization process that can be performed according to yet another embodiment. At process block 510, the plan script is optimized such that at least two deployment commands are executed simultaneously. The administrator can select to optimize the plan script such that the plan script can be executed as fast as possible. For example, a first deployment command to be executed on a first target computer device can be simultaneously with a second deployment command directed to a second target computer device. Thus, the optimization module 214 can be configured to determine which deployment commands are not interrelated and execute multiple target computing devices and/or infrastructure assets to be deployed with software components simultaneously. At process block 512 a plan script is executed to install the software components.

Figure 6:
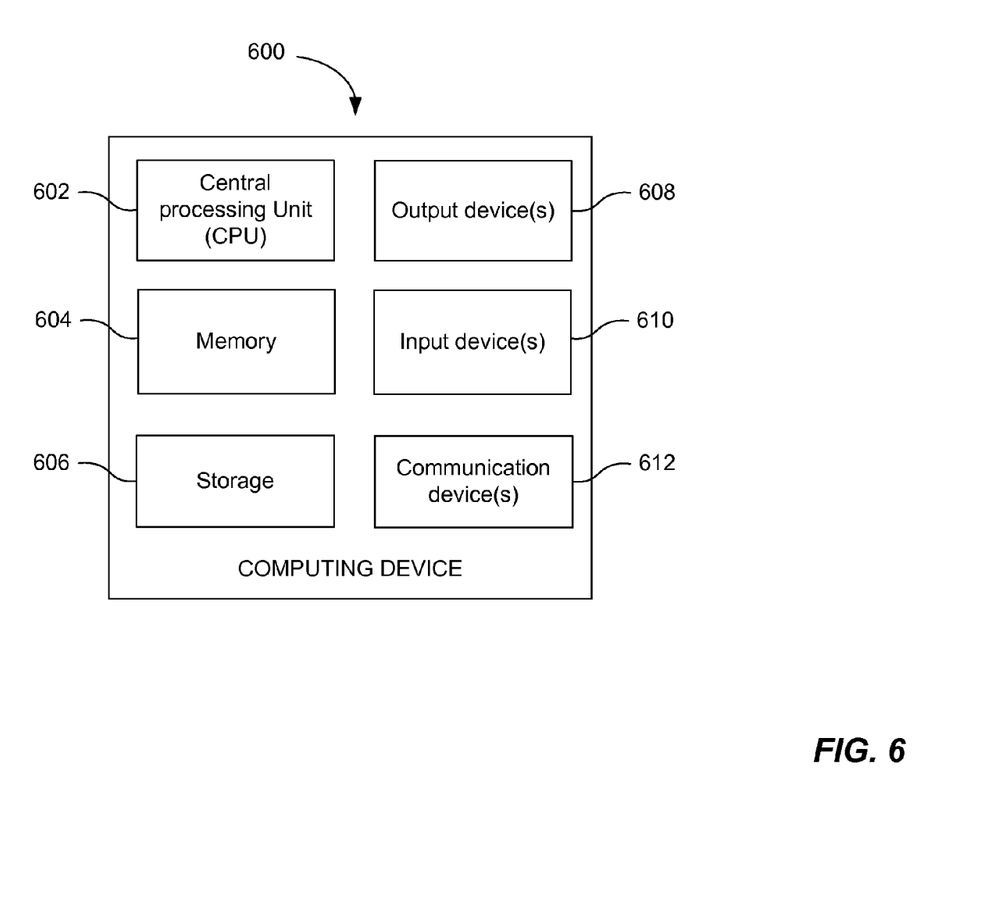
FIG. 6 illustrates a component diagram of a computing device according to one embodiment.

FIG. 6 illustrates a component diagram of a computing device according to another embodiment. The computing device 600 can be utilized to implement one or more computing devices, computer processes, or software modules described herein. In one example, the computing device 600 can be utilized to process calculations, execute instructions, receive and transmit digital signals, as required by the deployment control system 102, and/or target computing devices 110, 112. In another example, the computing device 600 can be utilized to process calculations, execute instructions, receive and transmit digital signals, receive and transmit search queries, and hypertext, as required by the plan generator 202, the plan execution engine 204, the optimization module 206, and the interpreter module 306.

The computing device 600 can be any general or special purpose computer now known or to become known capable of performing the steps and/or performing the functions described herein, either in software, hardware, firmware, or a combination thereof.

In its most basic configuration, computing device 600 typically includes at least one central processing unit (CPU) 602 and memory 604.

Depending on the exact configuration and type of computing device, memory 604 may be volatile (such as RAM), non-volatile (such as ROM, flash memory, etc.) or some combination of the two. Additionally, computing device 600 may also have additional features/functionality. For example, computing device 600 may include multiple CPU's. The described methods may be executed in any manner by any processing unit in computing device 600. For example, the described process may be executed by both multiple CPU's in parallel.

Computing device 600 may also include additional storage (removable and/or non-removable) including, but not limited to, magnetic or optical disks or tape. Such additional storage is illustrated in FIG. 6 by storage 206. Computer storage media includes volatile and nonvolatile, removable and non-removable media implemented in any method or technology for storage of information such as computer readable instructions, data structures, program modules or other data.

Memory 604 and storage 606 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 612 that allow the device to communicate with other devices. Communications device(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 600 may also have input device(s) 610 such as keyboard, mouse, pen, voice input device, touch input device, etc. Output device(s) 608 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. One or more computer-readable memory devices or storage devices having computer-executable instructions thereon that, when executed, perform acts comprising:
    obtaining live states of one or more target computing devices of a target computer infrastructure, the live states indicating software components currently installed on the one or more target computing devices;
    parsing a descriptor file to retrieve configuration data that declares a desired state of the one or more target computing devices of the target computer infrastructure, the desired state indicating a first software component for installation on the one or more target computing devices;
    identifying a set of individual target computing devices having corresponding live states indicating that the first software component is not installed;
    generating a plan script that includes executable deployment commands, wherein the executable deployment commands are configured to call functions to deploy the first software component to the individual target computing devices such that the corresponding live states of the individual target computing devices are changed to the desired state;
    determining, based on an administrator-configurable setting, when individual deployment commands are to be executed; and
    executing the plan script to deploy the first software component to the set of individual target computing devices, wherein execution of at least one of the individual deployment commands is delayed for a predetermined period based on the administrator-configurable setting.

2. The one or more computer-readable memory devices or storage devices of claim 1, wherein the target computer infrastructure is a network computer infrastructure.

3. The one or more computer-readable memory devices or storage devices of claim 1, wherein obtaining the live states of the one or more target computing devices comprises querying the one or more target computing devices.

4. The one or more computer-readable memory devices or storage devices of claim 1, wherein obtaining the live states of the one or more target computing devices comprises querying a live state database.

5. The one or more computer-readable memory devices or storage devices of claim 1, wherein the first software component includes at least one of: a computer program, a decryption key, an encryption key, or a compression table.

6. The one or more computer-readable memory devices or storage devices of claim 1, wherein the deployment commands are executable sequentially.

7. The one or more computer-readable memory devices or storage devices of claim 1, the acts further comprising optimizing the plan script such that the deployment commands are executable in a pre-specified order to minimize downtime of the one or more target computing devices, or in a pre-specified order that maximizes the speed at which the plan script is executed.

8. The one or more computer-readable memory devices or storage devices of claim 1, the acts further comprising optimizing the plan such that at least two of the deployment commands are executable simultaneously.

9. A method of deploying one or more software components to a target computer infrastructure, the method comprising:
    obtaining live states of one or more target computing devices of the target computer infrastructure, the live states indicating software components currently installed on the one or more target computing devices;
    parsing a descriptor file that declares a desired state of the one or more of target computing devices of the target computer infrastructure, the desired state indicating a first software component for use by the one or more target computing devices;
    identifying a set of the one or more of the target computing devices having live states indicating that the first software component is not currently installed;
    generating a plan script, wherein the plan script is generated in a procedural language that includes deployment commands configured to deploy the first software component to the identified set of target computing devices, wherein the first software component is configured to set configuration data in the identified set of target computing devices such that the live states of the identified set of target computing devices are changed to the desired state;

optimizing the plan script based on a configurable setting of a predetermined period for delaying execution of at least a first one of the deployment commands; and executing the plan script to deploy the first software component to the identified set of target computing devices, wherein execution of the first deployment command is delayed based on the predetermined period.

10. The method of claim 9, wherein the target computer infrastructure is a network computer infrastructure.

11. The method of claim 9, further comprising obtaining the live states of the one or more target computing devices by querying the one or more target computing devices.

12. The method of claim 9, further comprising obtaining the live states of the one or more target computing devices by querying a live state database.

13. The method of claim 9, wherein the first software component includes at least one of: a computer program, a decryption key, an encryption key, or a compression table.

14. The method of claim 9, wherein the executing comprises executing the deployment commands sequentially.

15. The method of claim 9, wherein optimizing the plan script further comprises changing when individual deployment commands are to be executed to cause the deployment commands to be executable in a pre-specified order that maximizes efficiency.

16. The method of claim 9, wherein the executing comprises executing the deployment commands such that at least two of the deployment commands are executed simultaneously.

17. A system comprising:

a plan generator configured to:

read a descriptor file that declares a desired state of a plurality of target computing devices of a target computer infrastructure, the desired state identifying a first software component for use by the plurality of target computing devices;

identify a set of individual target computing devices from the plurality of target computing devices, the set of individual target computing devices having individual corresponding live states indicating that the first software component is not currently installed, wherein live states of the plurality of target computing devices are obtained that indicate software components currently installed on the plurality of target computing devices; and generate a plan script that includes computer commands that deploy the first software component to the identified set of individual target computing devices such that the individual corresponding live states of the identified set of individual target computing devices are changed to the desired state;

an optimization module configured to optimize the plan script based on a configurable delay setting;

a plan execution engine configured to execute the plan script to deploy the first software component to the identified set of individual target computing devices, wherein the plan execution engine delays executing at least one of the computer commands of the plan script based on the configurable delay setting; and at least one processing unit configured to execute one or more of the plan generator, the optimization module, or the plan execution engine.

18. The system of claim 17, wherein the optimization module is further configured to determine when individual computer commands are to be executed such that the individual computer commands are executed sequentially.

19. The system of claim 17, wherein the optimization module is further configured to optimize the plan script such that the computer commands are executed in a pre-specified order that maximizes efficiency.

20. The one or more computer-readable memory devices or storage devices of claim 1, wherein the first software component is not installed on any of the one or more target computing devices when the live states are obtained.

* * * * *

UNITED STATES PATENT AND TRADEMARK OFFICE
CERTIFICATE OF CORRECTION

PATENT NO.         : 8,150,948 B2
APPLICATION NO.    : 11/767105
DATED              : April 3, 2012
INVENTOR(S)        : Andrews et al.

It is certified that error appears in the above-identified patent and that said Letters Patent is hereby corrected as shown below:

In Title page, in field (75), under "Inventors" column 1, line 3, delete "Shriver Blake" and insert -- Shriver-Blake --, therefor.

Signed and Sealed this
Sixth Day of November, 2012

David J. Kappos
*Director of the United States Patent and Trademark Office*